United States Patent
Sullivan, II (10) Patent No.: US 7,380,507 B2
(45) Date of Patent: Jun. 3, 2008

(54) RAIL TRANSPORTATION SYSTEM

(75) Inventor: Ennis Cornelius Sullivan, II, Allen, TX (US)

(73) Assignee: FasTran Transit, Inc., Wilmington, DE (US)

( * ) Notice: Subject to any disclaimer, the term of this patent is extended or adjusted under 35 U.S.C. 154(b) by 291 days.

(21) Appl. No.: 11/119,874

(22) Filed: May 2, 2005

(65) Prior Publication Data

US 2006/0243156 A1 Nov. 2, 2006

(51) Int. Cl.
*B61B 13/04* (2006.01)
(52) U.S. Cl. .................................... 104/118
(58) Field of Classification Search ............... 104/118, 104/120, 121; 105/141, 144, 145, 146
See application file for complete search history.

(56) References Cited

U.S. PATENT DOCUMENTS

| 3,168,875 | A | | 2/1965 | Reed |
| 3,190,235 | A | | 6/1965 | Bertin et al. |
| 3,198,139 | A | | 8/1965 | Dark |
| 3,286,651 | A | | 11/1966 | Dahl, Jr. |
| 3,319,581 | A | | 5/1967 | Churchman et al. |
| 3,865,040 | A | * | 2/1975 | Steen .................... 104/18 |
| 3,890,904 | A | | 6/1975 | Edwards |
| 3,985,081 | A | * | 10/1976 | Sullivan, II ........... 104/23.2 |
| 5,193,767 | A | * | 3/1993 | Mihirogi ................ 246/418 |

FOREIGN PATENT DOCUMENTS

FR 1253735 1/1961

OTHER PUBLICATIONS

Office Action issued on Jul. 12, 2007 of the U.S. Appl. No. 11/148,730.

* cited by examiner

*Primary Examiner*—S. Joseph Morano
*Assistant Examiner*—Robert J. McCarry, Jr.
(74) *Attorney, Agent, or Firm*—Haynes and Boone, LLP (57) ABSTRACT

A transportation system including a guide way defining multiple surfaces, each extending at an angle to the ground and at least one track mounted on one of the surfaces. A vehicle is adapted for movement along the guide way and is adapted to engage a corresponding track on the one surface when the vehicle is moving along the guide way in one direction and is adapted to engage a corresponding track on another surface when the vehicle is moving along the guide way in another direction.

3 Claims, 7 Drawing Sheets

RAIL TRANSPORTATION SYSTEM

BACKGROUND

This invention relates to a transportation system, and method of designing same, in which a vehicle travels along a guide way or track.

Public transportation systems, including monorail systems, two-track systems, magnetic levitation systems, etc., are becoming increasingly important as the population of urban areas continues to grow and automobile fuel prices continue to rise. It is important that public transportation systems be economically feasible, yet be large enough to transport a substantial amount of people yet maintain their stability during all operating conditions.

According to most prior designs, a vehicle, or series of interconnected vehicles, move over a track, or guide way, and the design is such that the center of gravity of each vehicle, even when it is loaded with passengers, baggage, etc., and subjected to external dynamic forces, is located within an area defined within the track or guide way to insure that the vehicle maintains adequate stability during all operating conditions. Therefore, in these arrangements, the width of each vehicle, and therefore its capacity, must be kept at relatively low values, which severely restricts the load (i.e., passenger) carrying ability of the vehicle.

Applicant's co-pending application (attorney's docket No. 32195.15) addresses this problem by disclosing a vehicle that has a center of gravity that is laterally spaced from the tracks on a guide way. A range of possible locations of the center of gravity in both the longitudinal and lateral directions of the vehicle can be established thus enabling the vehicles to be designed with a much greater width, and therefore capacity, when compared to standard systems. The disclosure of this application is incorporated by reference.

The present application represents a further improvement of the rail transportation system disclosed in the above application, by enabling bi-directional travel of the vehicles over a single guide way, and by enabling switching from a main guide way to and from an auxiliary guide way.

DETAILED DESCRIPTION

Figure 1:
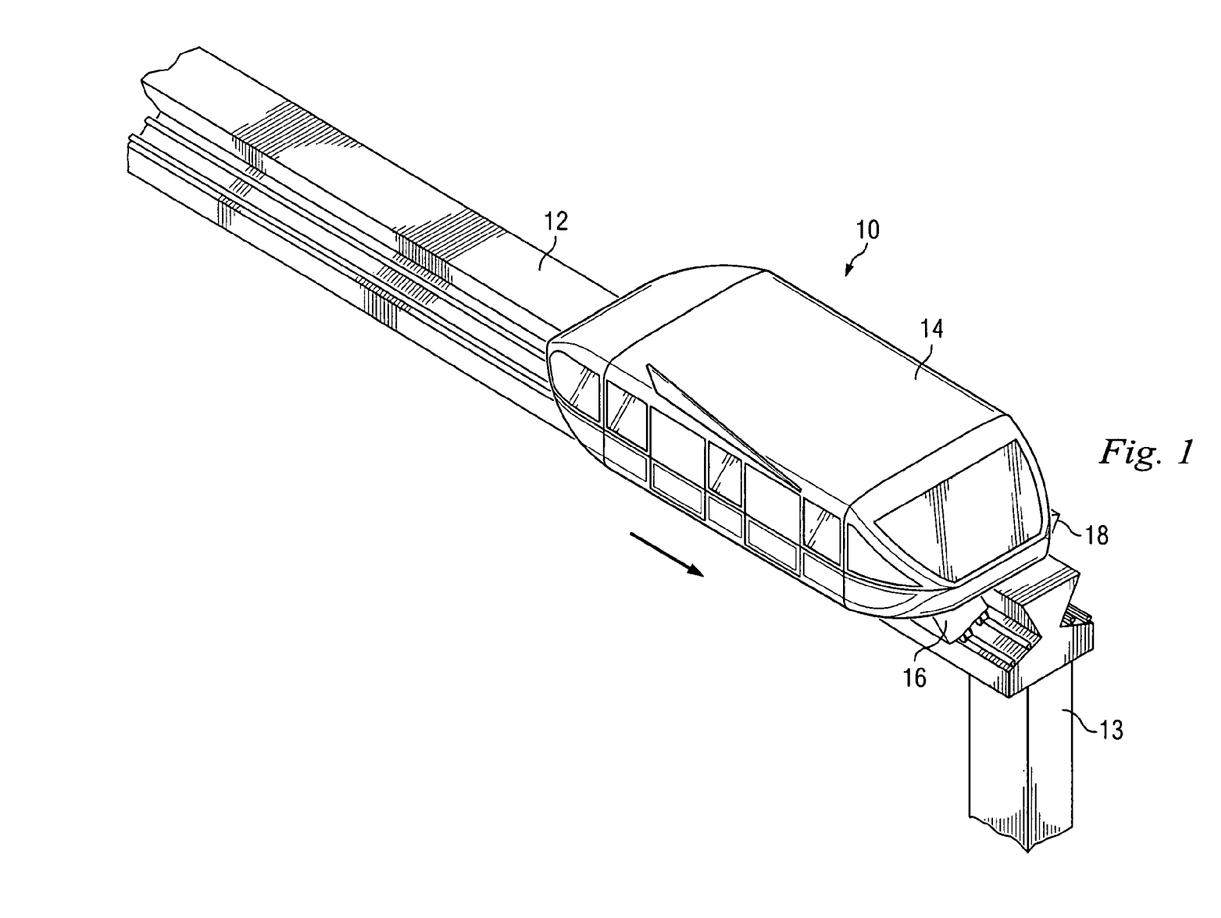
FIG. 1 is an isometric view of a rail transportation system according to an embodiment of the present invention.
Figure 2:
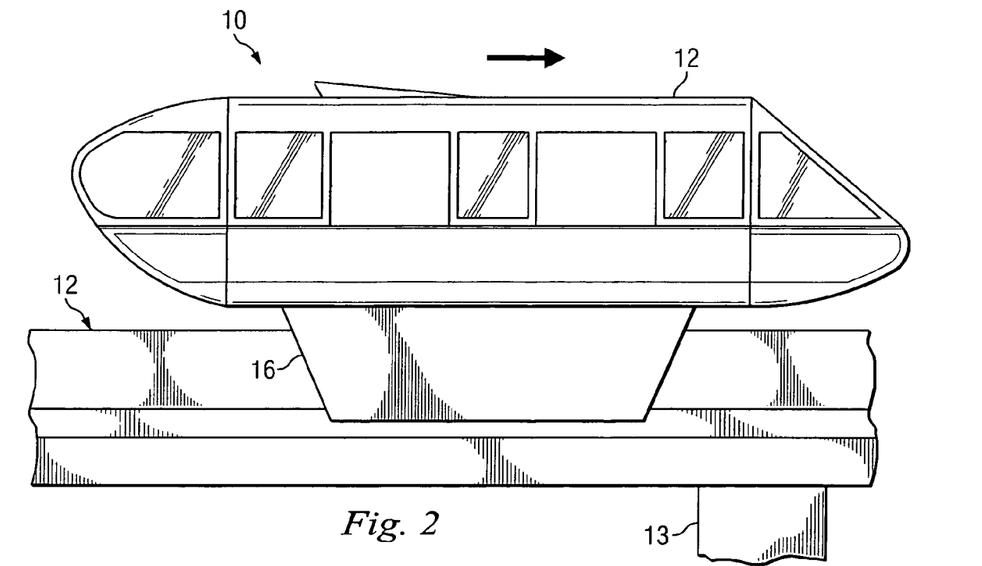
FIG. 2 is a side elevational view of the embodiment of FIG. 1.
Figure 3A:
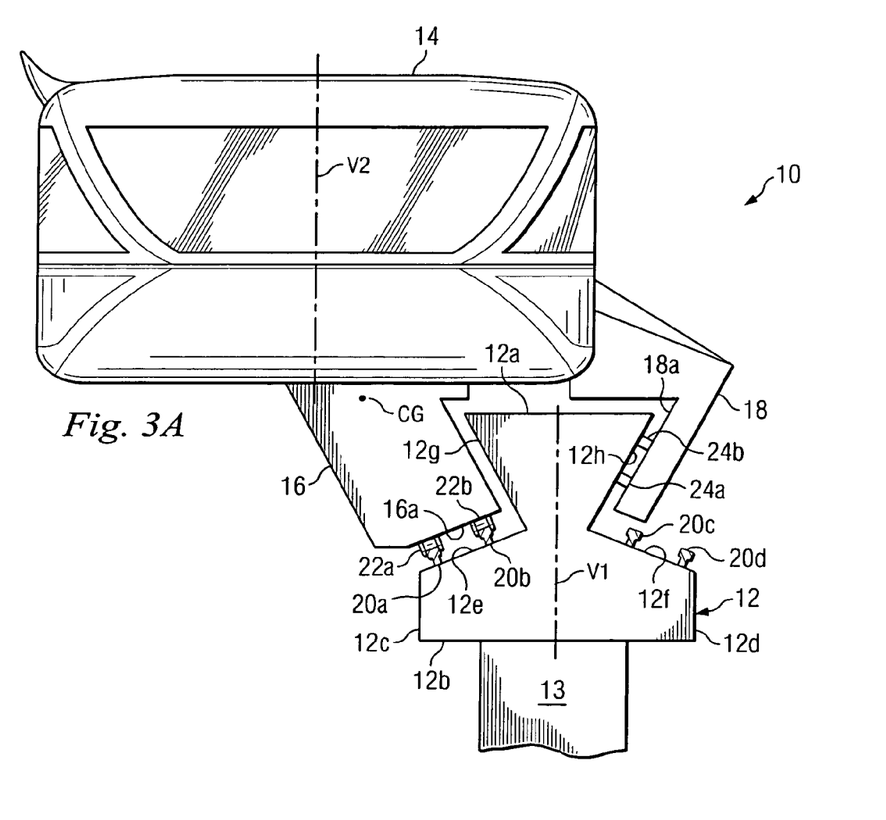
FIG. 3A is a front and rear elevational view of the embodiment of FIGS. 1 and 2.
Figure 3B:
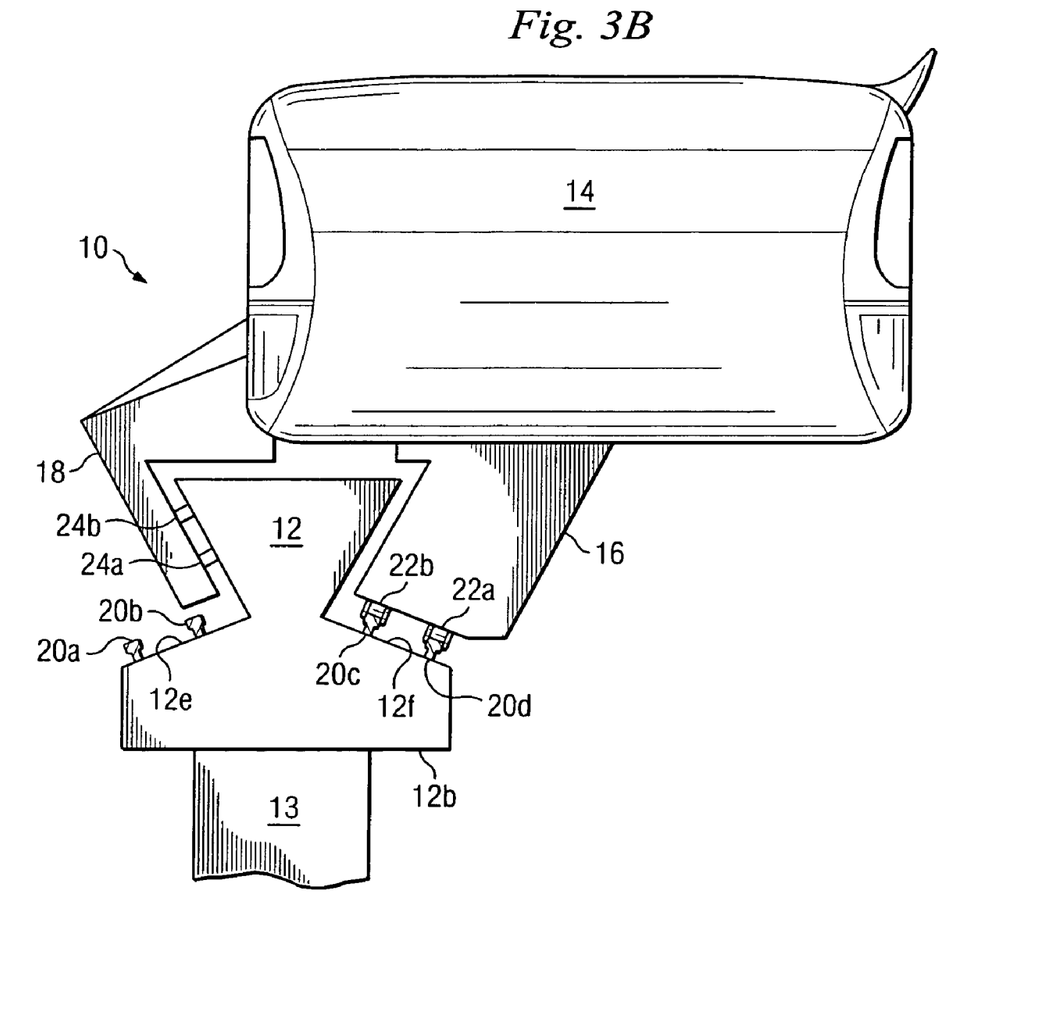
FIG. 3B is a view similar to that of FIG. 3A but depicting the vehicle of 3A in a reversed position.

Referring to FIGS. 1-3 of the drawings, the reference numeral 10 refers, in general, to a vehicle that moves along a guide way 12 that is supported in an elevated position by a plurality of columns 13, two of which are shown. The vehicle consists of a cabin 14, a housing 16 that extends from the cabin 14 to one side of the guide way 12, and a support arm 18 that extends from the cabin 14 to the other side of the guide way. The housing 16 and the arm 18 support the cabin 14 relative to the guide way in a manner to be described. The housing 16 and the arm 18 can be connected to the cabin 14 in any conventional manner or can be formed integrally with the cabin.

Referring to FIG. 3A, the guide way 12 is symmetrical about its vertical axis V1 and includes a flat, horizontal, upper surface 12a and a flat lower surface 12b that is supported on the upper surface of the columns 13 in any known manner. Two vertical side surfaces 12c and 12d extend upwardly from the lower surface 12b, and two side surfaces 12e and 12f are angled inwardly from the side surfaces 12c and 12d, respectively. Two additional angled side surfaces 12g and 12h are angled outwardly from the surfaces 12e and 12f, respectively, and extend to the upper surface 12a.

As shown in FIG. 3A, which depicts the front of the cabin 14, the cabin extends above the guide way 12 and the vertical axis V2 of the cabin 14 is laterally offset from the guide way 12 in a direction to the left as viewed in FIG. 3, for reasons to be described. The housing 16 and the arm 18 have angled outer surfaces 16a and 18a, respectively, which extend in a closely spaced, parallel, relation to the surfaces 12e and 12f, respectively, of the guide way 12.

A pair of laterally-spaced, longitudinally-extending rails, or tracks, 20a and 20b are mounted on the surface 12b of the guide way 12 in any conventional manner, and have curved upper surfaces. The tracks 20a and 20b are engaged by two corresponding wheels 22a and 22b that are rotatably mounted to the housing 16 in any conventional manner. The wheels 22a and 22b project a slight distance from the surface 16a of the housing 16, and extend perpendicular to the surfaces 16a and 12e. The outer circumferences of the wheels 22a and 22b are curved and extend over corresponding curved upper surfaces of the tracks 20a and 20b.

The wheels 22a and 22b are located in the front portion of the housing 16, and it is understood that two additional wheels (not shown), identical to the wheels 22a and 22b, respectively, are located in the rear portion of the housing, and are adapted to engage the tracks 20a and 20b in a similar manner. Two additional tracks 20c and 20d are mounted on the guide way surface 12f for reasons that will be described.

The guide way surface 12h is engaged by two wheels 24a and 24b that are rotatably mounted to the distal end portion of the arm 18 in any conventional manner. The wheels 24a and 24b project a slight distance from the surface 18a of the arm 18 and extend perpendicular to the surfaces 18a and 12h. The wheels 24a and 24b are not powered, and act as a counterbalance in a manner to be described. It is understood that two additional wheels (not shown), identical to the wheels 24a and 24b, respectively, are located in the rear portion of the arm.

Preferably, the wheels 22a and 22b are driven by an electric motor (not shown) disposed in the housing 16 which is connected to an electrical power source in a conventional manner. To this end, an electrical connecter (not shown) is mounted to the guide way 12, is connected to a source of electrical power, and maintains electrical contact with an electrical connector (not shown) on the vehicle 10 as the vehicle moves along the guide way 12 to transfer the electrical power to the motor in the housing 16.

The motor drives the wheels 22a and 22b in a conventional manner at a speed determined by the speed of the motor, and the wheels propel the vehicle 10 along the tracks 20a and 20b in a direction indicated by the arrows in FIGS. 1 and 2. The other set of wheels located in the rear portion of the housing 16 are powered in the same manner.

The location of the composite center of gravity of the vehicle 10 in two planes (corresponding to the width and height of the vehicle) is shown in FIG. 3A by the reference letters CG. The CG is defined in the above-identified application and a method for determining a range of locations for the CG in these two planes, as well as along the longitudinal axis of the vehicle, is disclosed in the latter application and the disclosure is incorporated by reference. In any case the location of the CG is laterally offset (to the left as viewed in FIG. 3A) of the outer track 20a and the outer wheel 22a. It is understood that the specific location of the CG shown in FIG. 3A is for the purpose of example only and can vary with each application, but in all cases it will be laterally offset from the track 20a and the wheel 22a, in a direction to the left as viewed in FIG. 3A.

The lateral and longitudinal offsets of the CG from the outer track 20a and the outer wheel 22a establishes downwardly-directed forces that are equal to the weight at the CG times the distance (moment arm) of the lateral offset and the distance of the above longitudinal offset. These forces considerably add to the stability of the cabin 14 as it moves along the tracks 20a and 20b.

It is also noted that the frusto-conical shape of the upper portion of the guide way 12 defined by the surfaces 12, 12g, and 12h, and the shape and positioning of the pertinent portions of the housing 16 and the arm 18 insure that the vehicle 10 will not come off of the guide way 12.

It is understood that the dynamic loading on the cabin 14 also continuously varies when the vehicle is in use. For example, the tracks 22a and 22b will include straight portions and curved portions, and when the cabin 14 moves from a straight track portion to a curved track portion and vice versa, the dynamic loading on the vehicle will vary accordingly. Also, the dynamic loading on the cabin 14 will vary with variations in the wind conditions acting on the vehicle, etc. However, the stabilizing forces discussed above will maintain the stability of the cabin 14 as long as the CG stays within the above range of locations.

It is also understood that additional vehicles, identical to the vehicle 10, can be connected together in a conventional manner and that each additional vehicle would be designed in the same manner described above in connection with the vehicle 10.

In the event that it is desired that the vehicle 10 travel along the guide way 12 in a direction opposite that shown in FIGS. 1, 2, and 3A, it can be removed from an end of the guide way 12 (using proper lifting equipment, a closed loop guide way with a switch, a turntable, or the like) and turned in the opposite direction before it is remounted on the guide way, as shown in FIG. 3B. In the position shown in FIG. 3B, the wheels 22a and 22b are in engagement with tracks 20d and 20c, respectively, and the wheels 24a and 24b are in engagement with the guide way surface 12g. In this position, the location of the CG is laterally offset (to the right as viewed in FIG. 3B) of the outer track 20a and the outer wheel 22a.

Figure 4:
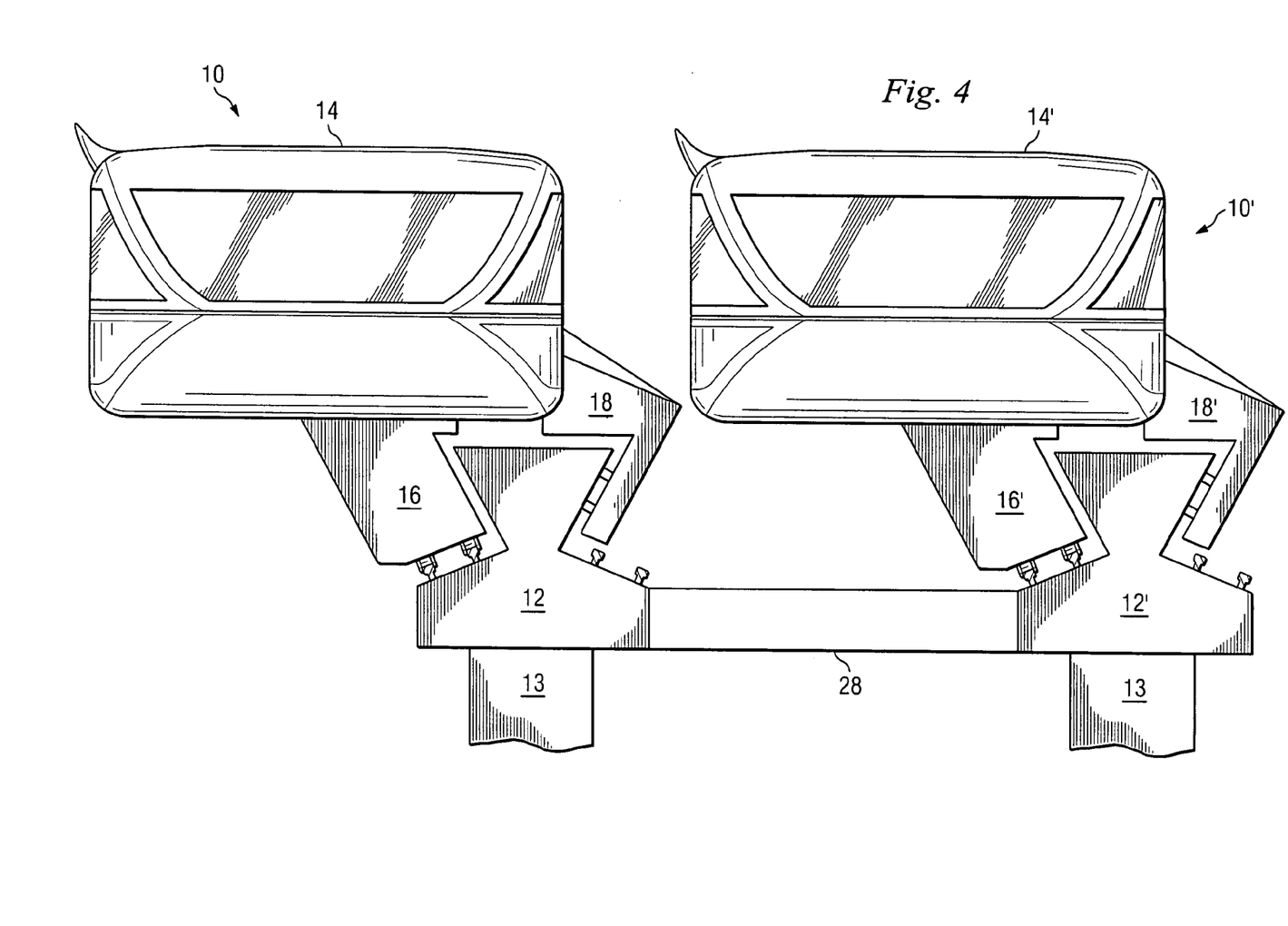
FIG. 4 is a view similar to that of FIG. 3A but depicting an alternate embodiment of the invention.

According to the embodiment of FIG. 4, the vehicle 10 is shown mounted on the guide way 12 in the same manner as in FIG. 3A, with the front of the vehicle being shown. Thus, the vehicle 10 travels in the direction shown by the arrows in FIGS. 1 and 2.

Another guide way 12', that is identical to the guide way 12, is provided that is installed on a column 13' in a spaced, parallel relation to the guide way 12. A vehicle 10' is mounted on the guide way 12' and is identical to the vehicle 10. Since the vehicle 10' and the guide way 12' are identical to the vehicle 10 and guide way 12, respectively, their respective components are referred to in FIG. 4 with the same reference numerals, but with a prime (') designation.

A connector block 28 extends between guide ways 12 and 12c' and is connected thereto in any conventional manner. It is understood that the connector block 28 can extend for the entire lengths of the guide ways 12 and 12' or there can be a plurality of spaced blocks all of which are connected to the guide ways.

In the embodiment of FIG. 4, the vehicle 10' is shown mounted on the guide way 12 in the same manner as the vehicle 10 in FIG. 3A, with the front of the vehicle 10' being shown. Thus, the vehicle 10' also travels in the direction shown by the arrows in FIGS. 1 and 2. It is understood, however, that one or both of the vehicles 10 and 10' can be removed from its corresponding guide way 12 and/or 12', and remounted to face, and therefore travel, in an opposite direction, as shown in FIG. 3B in connection with the vehicle 10. Thus, several combinations of directions of travel of the vehicles 10 and 10' are possible in the embodiment of FIG. 4.

According to the embodiment of FIGS. 5A-5E, two vehicles 10a and 10b are provided which are identical to the vehicle 10 in the embodiment of FIGS. 1, 2, 3A and 3B. Also, two guide ways 30 and 32 are provided which are identical to the guide way 12 of the latter embodiment with the exception that the guide ways 30 and 32 contain switchable sections 30a and 32a, respectively. The sections 30a and 32a are normally in line with the remaining portions of the guide ways 30 and 32, respectively, but can be switched in a manner discussed below.

It is understood that the guide ways 30 and 32 are supported in an elevated position by columns, or the like, in the same manner as the previous embodiments, and that connector blocks (not shown) could be provided that connect the guide ways, in the same manner as the previous embodiment.

Figure 5A:
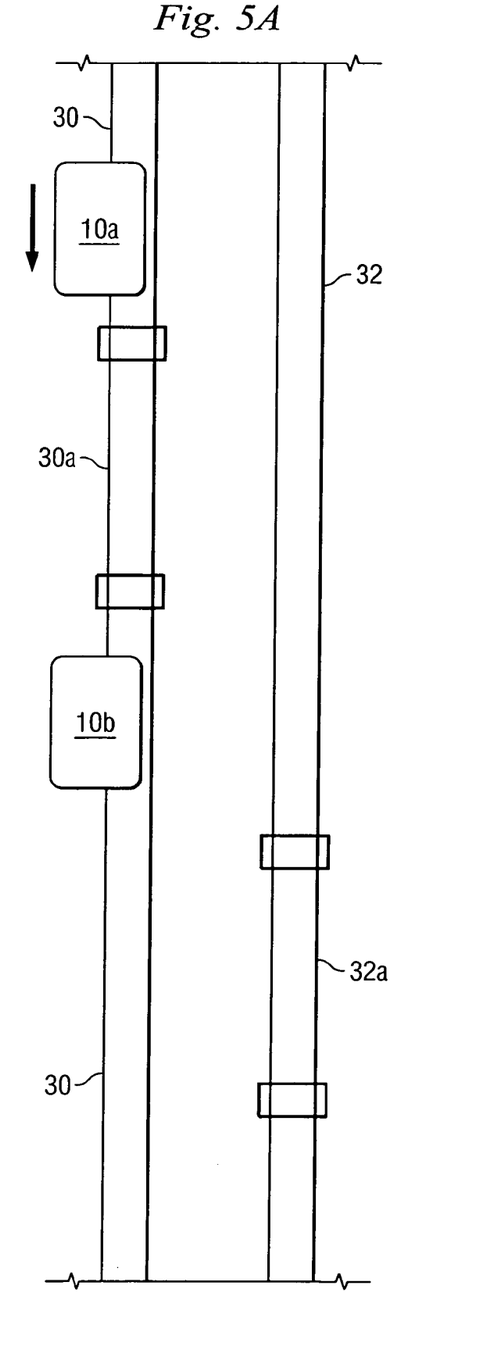
FIGS. 5A-5E are diagramatic views of a switching system that can be utilized in the above embodiments.

The vehicles 10a and 10b and the guide way 30 are shown in FIG. 5A in their normal operating modes, that is, with each vehicle being mounted on the guide way 30 in a manner to travel along the guide way in the direction indicated by the arrow. In this normal operating mode, the switchable section 30a of the guide way 30 is in line with the remaining portion thereof. For the purpose of example, it will be assumed that there are no vehicles traveling on the guide way 32.

Figure 5B:
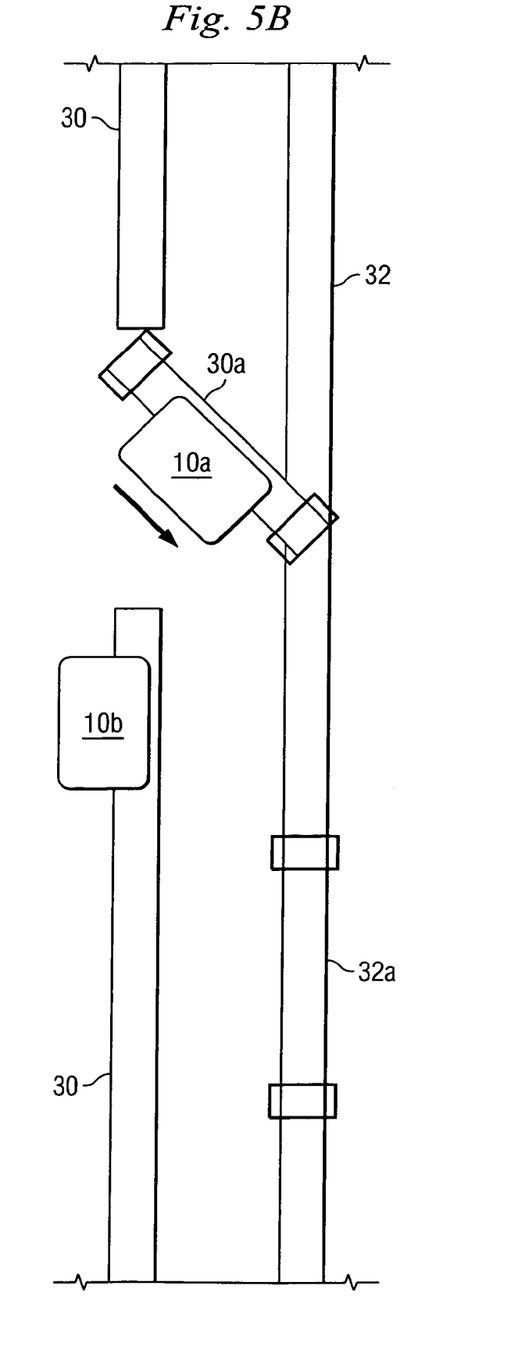

In the event that the vehicle 10b becomes stalled, or otherwise can't operate, the vehicle 10a can be moved around the vehicle 10b by switching the section 30a from its position in line with the remaining portion of the guide way 30 as shown in FIG. 5A to a position connecting it with the guide way 32, as shown in FIG. 5B. Thus, the vehicle 10a can travel from the guide way 30, across the section 30a and to the guide way 32.

Figure 5C:
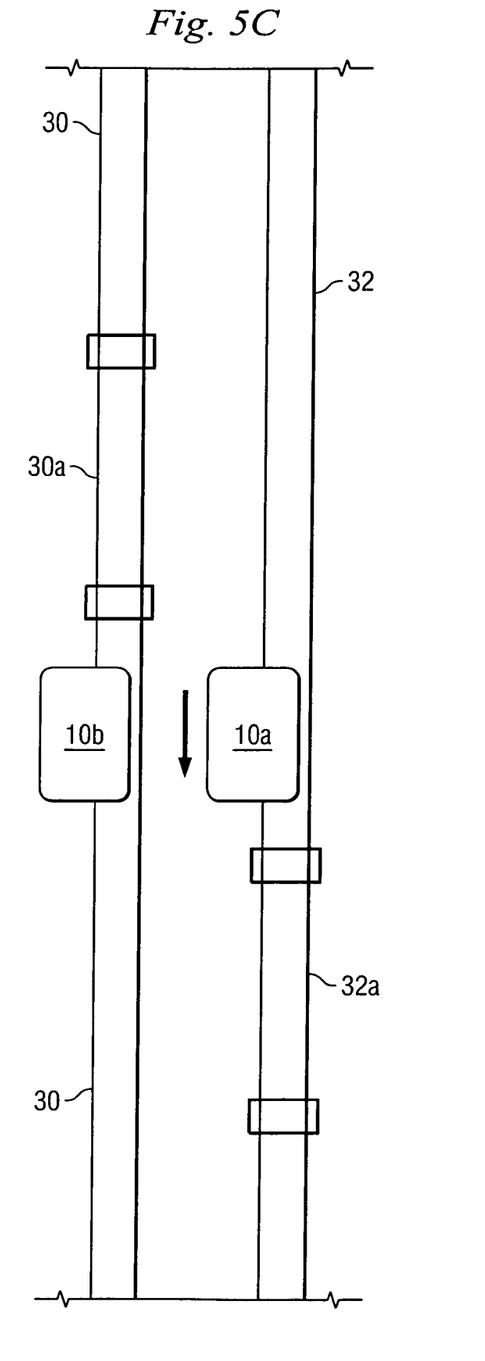
Figure 5D:
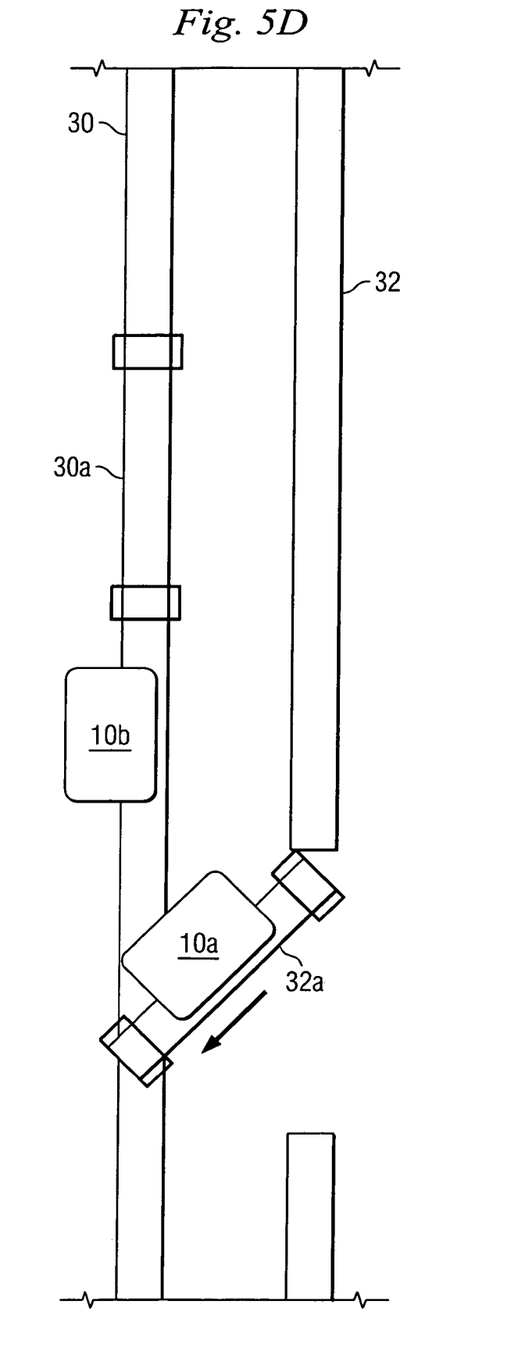
Figure 5E:
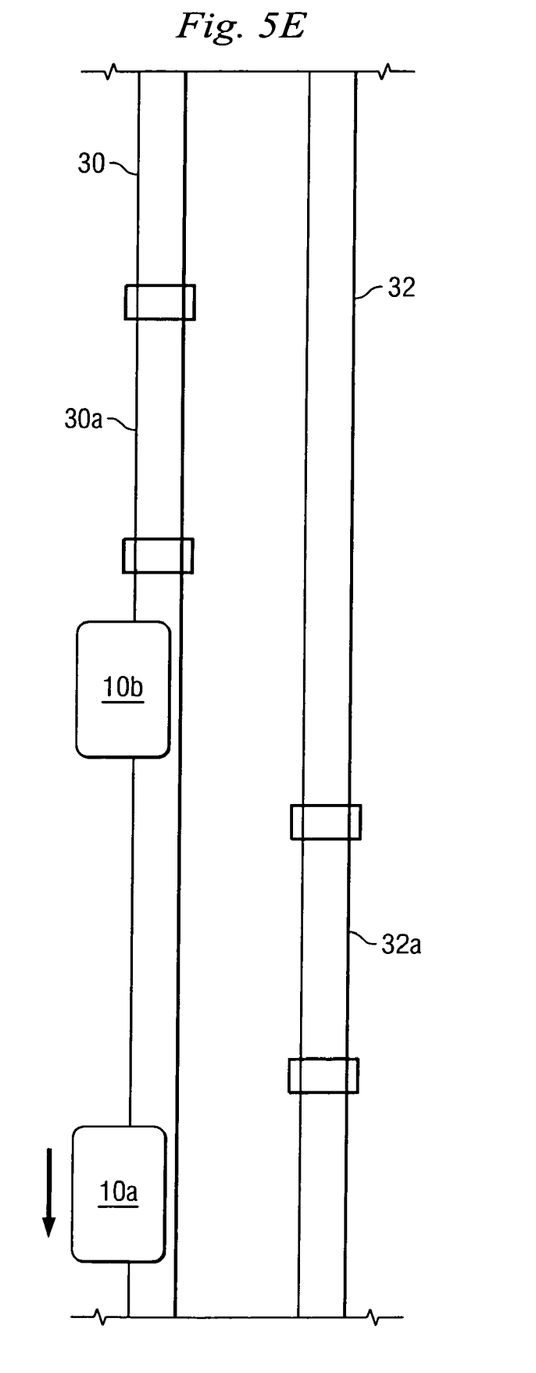

Referring to FIGS. 5C, the vehicle 10a can then travel along the guide way 32 and the section 30a is switched back to its in-line position with the remaining portion of the guide way 30. When the vehicle 10a passes the stalled vehicle 10b, and before it reaches the section 32a of the guide way 32, the latter section is switched from its position in line with the remaining portion of the guide way 32 as shown in FIG. 5C to a position connecting it with the guide way 30, as shown in FIG. 5D. Thus, the vehicle 10A can travel from the guide way 32, across the section 32a and to the guide way 30, and, since it is in front of the stalled vehicle 10b, it can continue to travel along the guide way 30.

It is understood that the proper interfaces between the guide ways 30 and 32 and the sections 30a and 32a are provided to enable the sections 32a and 32b to be properly connected to the guide ways 30 and 32 in a manner to permit travel over the guide ways in the above manner. Since these interfaces are conventional, they will not be described in detail.

Of course, in the event the vehicles 10a and 10b are traveling on the guide way 32, and one vehicle stalls, the other vehicle can be switched from the guide way 32, to the guide way 30, and back again, in the manner discussed above.

Several advantages result from the above and examples are as follows:

Since the preferred embodiment utilizes an electric motor, the energy saving realized by transporting a high volume of people, which otherwise could be using automobiles powered by internal combustion engines, is significant.

The guide ways and the vehicles discussed above can be easily elevated above the ground in the same right-of-way areas used by existing transportation systems, thus eliminating, or at least substantially reducing, the need for acquisition of new land space for the construction of the system.

The frusto-conical shape of the upper portion of the guide way 12 defined by the surfaces 12a, 12g, and 12h, and the shape and positioning of the pertinent portions of the housing 16 and the arm 18 prevent the housing 16 and the arm 18 from moving upwardly relative to the guide way 12 to insure that the vehicle 10 will not fall off of the guide way.

The downwardly-directed forces equal to the weight at the CG times the distance (moment arm) of the lateral and longitudinal offsets discussed above considerably add to the stability of the cabin 14 as it moves along the tracks 20a-20d.

The increased stability of the vehicle 10 as it moves along the tracks 20a and 20b, as discussed above, enables a relatively wide cabin 14 to be utilized that holds a higher number of people than would otherwise be possible.

The wheels 22a and 22b, as well as the wheels 24a and 24b, extend perpendicular to the angled surfaces 12e and 12h which insures continuous contact and traction between the wheels and the track, while reducing the tendency for the cabin 14 to oscillate about its points of contact with the tracks 20a and 20b.

Several variations of the above embodiments may be made within the scope of the invention and examples are set forth below.

The specific shape of the vehicles can be varied.
The number of tracks and the number of wheels engaging the tracks can be varied.
The specific design of the guide ways can be varied as long as the above advantages are achieved.
The number and type of wheels of the vehicles engaging the guide ways can be varied.
Other modes of power may be used to propel the drive wheels 22a and 22b.
Power may be supplied to the wheels 24a and 24b.
In the embodiment of FIGS. 5A-5E, the vehicles can be switched from the guide way 32, to the guide way 30, and back again to avoid a stalled vehicle on the guide way 32.

Those skilled in the art will readily appreciate that many other variations and modifications of the embodiment described above may be made without materially departing from the novel teachings and advantages of this invention. Accordingly, all such variations and modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A transportation system comprising:
   a guide way defining a vertical axis, a pair of side surfaces, and first, second, third, and fourth surfaces,
      wherein the first and second surfaces are symmetrical about the vertical axis and are angled inwardly from respective ones of the side surfaces, and
      wherein the third and fourth surfaces are symmetrical about the vertical axis and are angled outwardly from the first and second surfaces, respectively;
   at least one track mounted on the first surface;
   at least one track mounted on the second surface;
   a vehicle having a composite center of gravity, the vehicle comprising:
      a cabin,
      at least one wheel rotatably mounted on the cabin; and
      at least one additional wheel mounted on the cabin;
   a first configuration in which:
      the vehicle moves along the guide way in a first direction;
      the at least one wheel engages a corresponding track on the first surface;
      the at least one additional wheel engages the third surface; and
      the composite center of gravity of the vehicle is laterally offset in a third direction from the track mounted on the first surface; and
   a second configuration in which;
      the vehicle moves along the guide way in a second direction, wherein the second direction is diametrically opposite the first direction;
      the at least one wheel engages a corresponding track on the second surface;
      the at least one additional wheel engages the fourth surface; and
      the composite center of gravity of the vehicle is laterally offset in a fourth direction from the track mounted on the second surface, wherein the fourth direction is diametrically opposite the third direction.

2. The system of claim 1 wherein there are two tracks mounted on the first surface and two tracks mounted on the second surface; and wherein there are two wheels rotatably mounted on the cabin and adapted to respectively engage the two tracks.

3. The system of claim 1 wherein there are two additional wheels rotatably mounted on the cabin and adapted to respectively engage the third surface and the fourth surface.

* * * * *